Patented June 27, 1939

2,163,643

UNITED STATES PATENT OFFICE 2,163,643

PROCESS FOR PRODUCING PROTEOLYTIC ENZYME FROM FICUS LATEX

Alphonse Walti, Westfield, N. J., assignor to Merck & Co. Inc., Rahway, N. J., a corporation of New Jersey No Drawing. Application August 6, 1936, Serial No. 94,585

6 Claims. (Cl. 195—66)

This invention relates to an active proteolytic enzyme obtained from ficus latex in crystalline form, and to processes for its production.

It has long been known that the latex of certain species of the genus ficus exhibits anthelmintic properties. Various more recent investigators have confirmed the presence of an anthelmintically active substance in the ficus latex, and some of them have directed their efforts to separating the same from the other constituents present in the latex.

In U. S. Patent No. 1,616,291, February 1, 1927, Weyland has disclosed a process for treating the latex of Ficus glabrata, for example. His purpose was to overcome the objections to the use of the latex itself by extracting a solid active substance from it. His process as disclosed comprises the treatment of the latex with two parts of a water-soluble organic solvent (acetone, specifically) whereby a "tough mass" is produced. This mass is then separated out and extracted with, say, petroleum ether, at a temperature not exceeding 30° C. In this manner, he obtained a dry brown powder, which he described as soluble in water and precipitated by alcohol or acetone, but which was not otherwise characterized.

Robbins (Jr. Biol. Chem. 87, 251–57, 1930) has also reported the production of a light yellowish, amorphous powder from Fiscus laurifolia by another process. He first removes the suspended matter from the latex by centrifugation, then adds three parts of acetone to the fluid portion, redissolves in water, reprecipitates with acetone, and dries the resulting product in vacuum. Robbins went a step further over his prior art as to the characterization of the product obtained from the latex, in that he not only confirmed the anthelmintic action of his extract, but was also able to demonstrate the presence of a strongly proteolytic enzyme. He states, however, (p. 253, lines 9–13) "We do not wish to leave the impression that we believe the precipitate to be the pure principle or that the active part is necessarily of protein nature, but that the active principle is contained in the precipitated protein mixture."

The present applicant has now succeeded in definitely isolating and characterizing the true active principle as a proteolytic enzyme and in producing the same in pure crystalline form.

From the instant work, it is now quite clear that the products of Weyland and Robbins, while being more or less concentrated, anthelmintically active extracts of the latex were not the pure active proteolytic principle but rather indefinite and impure mixtures. Further, applicant has now also established the fact that the crystalline substance which has the property of an anthelmintic also has the properties of a proteolytic enzyme.

The failure of prior workers to recognize the crystallizability of the proteolytic enzyme and to isolate it in its crystalline form may have been and probably was largely due to the inaptness of the pretreatments to which they subjected their latex.

The latex as it is obtained from the tree contains a highly dispersed waxy suspensoid, together with varying amounts of other solid foreign materials, and it is important, as I have found, to remove all of these in order to isolate the active enzyme in pure form and in substantial yield, and by a method which will not interfere with the formation or the preservation of the crystalline form.

In the old art, as explained above, it has been the practice to attempt to separate the suspended waxy material, etc., from the latex by centrifugation or by extraction with organic solvents. Both of these methods possess disadvantages which render them unsatisfactory for the pretreatment of latex, as is intended for the present purpose, and a completely "purified" latex is not obtained with either of them.

When it is attempted to remove the foreign solid and semi-solid "impurities" from the latex by centrifugation, the necessary handling of the material during the process of separating the formed layers will cause some of the foreign substances to become re-mixed with the residue of the latex, not to speak of the difficulty of completely separating the waxy constituent from the aqueous part.

While it is possible to dissolve out the unwanted semi-solid waxy suspensoid from the latex by means of certain organic solvents, in order also to remove the other contaminating material which is present in the original latex, it would be necessary to treat the latex with various solvents having selective solubility for the different impurities. There are present, also, various forms of debris in the crude latex which must also be removed in order to prevent interference with smooth crystallization.

From the above, it will be seen that neither of the old art pre-treatments is serviceable for the complete purification of the latex and the production of the enzyme in pure crystalline form.

It has now been found to be an important preliminary step to pre-treat the crude latex in such a manner as to separate out substantially all of the semi-solid and solid constituents, and more especially the waxy suspensoid, before proceeding with the crystalization of the pure enzyme out of the treated liquid, and thus to prevent the disguise or destruction of the extremely delicate and evanescent crystalline forms sought or the inhibition of their formation.

I have now found that substantial purification of the latex as such a preliminary step of the process may be best accomplished by careful filtration under suction. Ordinary off-hand laboratory filtration will not be satisfactorily effective because of the highly dispersed character of the wax suspensoid. In the preferred method of filtration a moderately coarse and readily permeable filter paper is used for repeated filtrations, so that the same becomes partially impregnated with the waxy substance derived from the latex itself in previous filtration steps, which then acts as an inert filter aid. A substantially dewaxed latex is thus obtained which lends itself clearly and efficiently to the further crystallization steps and results in good yield.

Acocrding to a specific embodiment of this step of my invention, I make a preliminary filtration of strongly cooled ficus latex through a relatively coarse filter paper and then utilize this partially wax-impregnated coarse filter paper as a filtration medium in a second and further filtration steps, as may be necessary to substantially completely remove the unwanted solid and semi-solid materials, the number of filtrations depending in part upon the texture of the filter paper available and the physical condition of the crude latex put into process.

Depending on the practical conditions encountered, it is also advantageous at times, in the last stages of repeated filtrations, to make use of some other inert filter aid, such as a purified diatomaceous earth.

During the course of careful experimentation along these lines with various specimens of latex, there was clear evidence of the crystallizability of the active principle, an unusual and unexpected condition for a proteolytic enzyme.

Once the presence of crystallizable material in the latex was definitely established, it was possible to separate out the crystals from the carefully pretreated latex. For example, the enzyme may be crystallized out of the thus purified liquid by changing the hydrogen ion concentration by partial neutralization of the acid medium with, say, about N. sodium hydroxide to a pH range of about 5–6, by concentration in vacuo, by seeding, by subjecting the liquid to a low temperature of, say, between 0° and 7° C., or by a suitable combination of these methods. The crystals can be removed from the mother liquor by centrifugation.

Furthermore, the proteolytic enzyme also may be obtained in pure crystalline form by precipitating the protein fraction of latex, purified according to the method previously described herein, with a suitable protein precipitant as, for instance, magnesium sulfate. In this latter case, the precipitated protein fraction thus obtained is dissolved in a small quantity of a dilute acid, such as about 0.05 N. hydrochloric acid, the solution neutralized with a base such as 0.15 N. sodium hydroxide, and allowed to stand preferably at not in excess of room temperature. The amount of crystals obtained is then further increased by storing the material in a refrigerator, say, at about 0° to 7° C. The formed crystals are filtered by pouring on an ordinary filter paper, and are then washed with a slightly acidified solution of sodium chloride.

The crystalline substance as obtained by either general method of preparation can be recrystallized by dissolving it in 0.05 N. hydrochloric acid, filtering the solution if necessary, and by the addition of dilute alkali, say, 0.5 N. sodium hydroxide in such manner that no permanent turbidity occurs and at which stage the solution still is slightly acid to litmus. The solution may be seeded and left at room temperature and for further crystal formation is subjected to temperatures of 0° to 7° C. The crystalline substance is filtered off and washed with an acidulated 3% sodium chloride solution.

The pure, highly active enzyme obtained according to the methods described herein occurs as colorless crystals. The composition of the crystals, with regard to nitrogen, carbon, hydrogen, and sulfur, is in agreement with the protein nature of the substance and shows the characteristic biuret reaction.

Throughout the operation it is desirable to work rapidly and under as low temperature conditions as practicable. The crystalline form of the materials which are the subject of this disclosure, as has already been incidentally indicated, is prone to impairment and further special means for stabilization and preservation are required to prevent such deterioration by the action of the moisture and oxygen of the atmosphere.

I claim as my invention:

1. A step in the process for producing the proteolytic enzyme of ficus latex in pure crystalline form, which comprises filtering the crude latex with a filter medium which is prepared for the ultimate filtration step by adhering wax globules derived from a previous filtration step.

2. The process for producing a proteolytic enzyme from ficus latex in crystalline form which comprises pre-treating the crude latex by filtration to remove the solid and semi-solid constituents, and partially neutralizing the treated liquid to change its hydrogen ion concentration and thereby facilitate separation of the crystallized material.

3. The process for producing a proteolytic enzyme from ficus latex in crystalline form which comprises pre-treating the crude latex by filtration to remove the solid and semi-solid constituents, and concentrating the treated liquid to thereby facilitate separation of the crystallized material.

4. The process for producing a crystalline proteolytic enzyme from ficus latex which comprises pre-treating the crude latex by filtration to remove the solid and semi-solid constituents, and permitting the treated liquid to stand at a temperature between about 0° and 7° C., to thereby facilitate separation of the crystallized material.

5. The process for producing a proteolytic enzyme from ficus latex in crystalline form, which comprises pre-treating the crude latex by filtration to remove the solid and semi-solid material present therein, precipitating the protein fraction of the treated liquid, and separating the enzyme from the precipitate.

6. The process for producing a proteolytic enzyme from ficus latex in crystalline form which comprises pre-treating the crude latex by filtration to remove therefrom the solid and semi-solid material, precipitating the protein fraction of the treated latex with magnesium sulfate, dissolving the precipitate in a small quantity of 0.05 N. hydrochloric acid, neutralizing the solution with 0.5 N. sodium hydroxide, allowing the solution to stand at a temperature not in excess of room temperature, filtering off the formed crystals, and washing them with a slightly acidified solution of sodium chloride.

ALPHONSE WALTI.